Aug. 30, 1960 H. W. SMITH 2,950,879
LIFT MODIFYING PROTUBERANCE AND AIRFOIL COMBINATIONS
Filed Jan. 9, 1956 5 Sheets-Sheet 1

INVENTOR.
HOWARD W. SMITH
BY
Reynolds, Beach & Christensen
ATTORNEYS

Aug. 30, 1960  H. W. SMITH  2,950,879
LIFT MODIFYING PROTUBERANCE AND AIRFOIL COMBINATIONS
Filed Jan. 9, 1956  5 Sheets-Sheet 2

INVENTOR.
HOWARD W. SMITH
BY
Reynolds, Beach & Christenson
ATTORNEYS

Aug. 30, 1960  H. W. SMITH  2,950,879
LIFT MODIFYING PROTUBERANCE AND AIRFOIL COMBINATIONS
Filed Jan. 9, 1956  5 Sheets-Sheet 3

INVENTOR.
HOWARD W. SMITH
BY
Reynolds, Beach & Christensen
ATTORNEYS

Aug. 30, 1960  H. W. SMITH  2,950,879
LIFT MODIFYING PROTUBERANCE AND AIRFOIL COMBINATIONS
Filed Jan. 9, 1956   5 Sheets-Sheet 4

INVENTOR.
HOWARD W. SMITH
BY
Reynolds, Beach & Christensen
ATTORNEYS

Aug. 30, 1960 H. W. SMITH 2,950,879
LIFT MODIFYING PROTUBERANCE AND AIRFOIL COMBINATIONS
Filed Jan. 9, 1956 5 Sheets-Sheet 5

INVENTOR.
HOWARD W. SMITH
BY
Reynolds, Beach & Christensen
ATTORNEYS

United States Patent Office 2,950,879
Patented Aug. 30, 1960

2,950,879

LIFT MODIFYING PROTUBERANCE AND AIR-FOIL COMBINATIONS

Howard W. Smith, Seattle, Wash., assignor to Boeing Airplane Company, Seattle, Wash., a corporation of Delaware Filed Jan. 9, 1956, Ser. No. 557,913

18 Claims. (Cl. 244—41)

This invention relates to the combination of a protuberance and an airfoil in a supersonic aircraft in which the protuberance produces a modification of the airfoil lift at supersonic speeds. At such speeds the protuberance will induce a compressional bow wave and an expansion waist wave. The protuberance and airfoil are positionally related so that either such bow wave or such waist wave will alter the airfoil lift in a desired manner. A pair of such protuberances can be provided in symmetrical arrangement at opposite sides of the longitudinal axis of the aircraft, or at opposite sides of an airfoil, so that the lift modifying action of such pair of protuberances can be coordinated.

As one example, the forward end of a protuberance can be located beneath a wing to increase the positive pressure beneath it, or the waist of a protuberance tapered oppositely from such waist may be located on the upper side of an airfoil to decrease the negative pressure above it. Alternatively, protuberances located on opposite sides of an airfoil can be placed so as to increase the pressure on one side of the airfoil and decrease the pressure on the opposite side.

Air reaction modifying protuberances can be mounted for movement relative to an airfoil so that the modifying effect of the protuberance can be altered for control purposes.

The air reaction modifying capability of protuberances employed in the present invention is predicated upon the phenomena of supersonic airflow about a protuberance tapered oppositely fore and aft from a waist portion located generally centrally between its ends and of a cross-sectional area transversely of the direction of air flow larger than the other transverse cross-sectional areas of the protuberance. The flow phenomena about such a protuberance includes the production of a compressional bow wave at the leading end of the protuberance, behind which the pressure exceeds ambient atmospheric pressure, and an expansion waist wave between the waist portion of the protuberance and its aft end, behind which the air pressure is below ambient atmospheric pressure in a generally cooresponding degree. The objects of the present invention are therefore accomplished by locating a protuberance relative to an airfoil so that the compressional bow wave or the waist expansion wave, or both, will modify the air reaction which would be produced by the airfoil alone.

A principal object of the present invention is to improve the lift characteristics of an airfoil over the surface of which air flows at supersonic speeds.

A further object is to increase the lift of such an airfoil with minimum increase in its drag.

More specifically, an object of the invention is to improve the lift characteristics of an airfoil either by increasing the pressure on its high pressure side, or by reducing further the pressure on its low pressure side, at supersonic speeds.

Another object is to provide more effective control of an aircraft at supersonic speeds.

An additional object is to design necessary protuberances from an airfoil of a supersonic aircraft of shapes and to place them at locations such that they will produce a compressional bow wave or an expansion waist wave which will increase the lift of the airfoil.

Still another object is to effect movement of such protuberances for the purpose of improving the lift of an airfoil most effectively and at the most desired location, or for the purpose of trimming the aircraft, or for the purpose of controlling the flight path of the aircraft, or for a combination of such purposes.

A further object is to provide protuberances which accomplish the above-mentioned objects at supersonic speeds, yet which will not appreciably impair the lift characteristics of the airfoil at subsonic speeds.

A protuberance of a type capable of accomplishing these objects might be oppositely tapered from its waist as stated above and may have a sharp prow, such as being double-ended. At least a portion of such protuberance may be of U-shape or approximately semi-circular cross-section, having a substantially flat surface disposed adjacent to the surface of an airfoil the pressure characteristics of which are to be modified by the protuberance. If the pressure at the high pressure side of the airfoil is to be modified by the protuberance, the leading portion of such protuberance will be located adjacent to the trailing edge of the airfoil with the portion of the protuberance aft of the waist being in non-overlapping relationship with the airfoil. Conversely, if the pressure on the low pressure side of the airfoil is to be modified, preferably the waist portion of the protuberance will be located adjacent to the leading edge of the airfoil with the portion of the protuberance forward of the waist being in non-overlapping relationship with the airfoil. A pair of such protuberances including two protuberances mounted symmetrically on opposite sides of the longitudinal axis of the aircraft may be provide with control mechanism for moving them fore and aft similarly or differentially to vary their airfoil lift modifying characteristics for trimming or control purposes. Other types of movably mounted protuberances may also be employed for such purposes, but in these various cases such moving mechanism may be locked when the aircraft is flying at subsonic speeds. Representative illustrations of such protuberances are shown in the accompanying drawings.

The wings of an airplane flying at supersonic speeds have satisfactory lift characteristics, but the higher the speed of the airplane the greater will be the drag. Consequently, it is desirable to reduce the area of the wing, as well as of other parts of the airplane, as much as possible. The higher the lifting efficiency of the wing is, therefore, the smaller it may be for a given airplane, and consequently the less drag it will have. The lift creating ability of the wing will be improved if the pressure above the wing can be farther reduced or the pressure below the wing increased. The same principles apply to the aerodynamic force creating ability of empennage surfaces either for the purpose of stabilizing the airplane or of controlling it. If such surfaces can be modified so as to produce a greater force transversely of the direction of flight, their area to that extent may be reduced.

The installation of appropriate protuberances on the high pressure side of airfoils can increase the pressure on such airfoil surfaces for the purpose of increasing their aerodynamic reaction force transversely of the direction of flight at supersonic speeds. Conversely, appropriate protuberances can be mounted on the low pressure side of airfoils to decrease still further the pressure on such airfoil surfaces. In both cases such protuberances are effective to modify the aerodynamic forces on the airfoils primarily at supersonic aircraft speeds. These protuberances are useful both on supersonic aircraft sustained solely by wing lift at subsonic speeds, and on aircraft which depend largely on some factor other than direct wing lift for sustaining them at subsonic speeds. Thus an aircraft of the latter type could be launched as a projectile, or its flight could be initiated in a vertical direction so that its sustentation initially would depend wholly or primarily on propulsive force rather than on airfoil lift. Alternatively, such an aircraft could be launched from another aircraft at an altitude sufficiently great that it could descend until it had reached supersonic speed. Whether or not an aircraft depends on wings for sustentation purposes protuberances in accordance with the present invention may therefore be used for effecting control of such aircraft. For such purposes the protuberances will be mounted for movement relative to airfoils, and cooperating protuberances may be mounted for similar or differential movement depending upon the type of installation used and the type of control operation to be effected.

Thus while the protuberances of the present invention will undoubtedly find their greatest utility on airplanes of supersonic type and their representative installations discussed below are primarily intended for airplanes, it will be understood that such protuberances, particularly of the movable type, can also be utilized on stabilizing airfoils of supersonic aircraft which would not be classified as airplanes because they do not rely primarily on lift induced by airfoils for sustentation. Whether used on airplanes or other types of aircraft of supersonic character, such protuberances may be of a size and shape to provide the desired degree of pressure increase on the high pressure side of an airfoil or pressure decrease on the low pressure side of an airfoil, and may be located so as to produce such alterations in pressure at the desired location or locations on a given airfoil.

In order simply to produce an increase in wing lift at supersonic speeds, protuberances fixed relative to an airfoil such as an airplane wing may be utilized, and it is not always necessary that the protuberance have no other function. On the contrary, such a protuberance may, for example, be an airplane engine, a fuselage, a bomb, a fuel tank, or a retractable landing gear housing, provided that it is shaped and located properly to produce the desired increase in positive pressure on the high pressure side of the airfoil or the desired decrease in negative pressure on the low pressure side of the airfoil.

In the case of an airplane wing in normal flight its lower side is always its high pressure side so that protuberances located beneath the wing will be designed and arranged to increase the pressure beneath the wing. Alternatively, the upper side of the wing in normal flight is always the negative pressure side. Consequently, when protuberances are located above the wing they should be designed and arranged so that the flow over them will reduce still farther the pressure above the wing. When the protuberances are intended to produce control forces rather than simply serving to aid wing lift, such protuberances must be arranged so that their movement will produce desired variations in the wing lift forces rather than primary consideration being given to improving the lift characteristics of the wing.

Useful, positive pressure fields with negligible increase in drag may be produced by the compressional bow wave induced by a protuberance of proper shape when traveling through the air at supersonic speeds. In order for such a positive pressure field to increase the lift or aerodynamic force transversely of the direction of flight produced by an airfoil, the protuberance may be of a shape nonsymmetrical about a horizontal plane. A conical point, for example, will produce a compressional bow wave at supersonic speeds which will be symmetrical about any plane including its longitudinal axis, assuming that such axis is aligned with the relative wing direction.

On the other hand, a semiconical body mounted at one side of an airfoil with an axial plane through the conical structure adjacent to the airfoil will produce a compressional bow wave at supersonic speeds having a positive pressure field of triangular shape and maximum area adjacent to the airfoil and its longitudinal sectional area in planes parallel to the airfoil diminishes away from the airfoil. The apex of the semiconical positive pressure field will substantially coincide with the apex of the conical body, and the included angle of such pressure field apex will depend upon the apex angle of the body and the speed of the relative wind. The smaller the apex angle of the body and the higher the relative wind speed, the smaller will be the included angle of the compressional bow wave apex. Consequently, the apex angle and cross-sectional shape of the body may be designed to produce a compressional bow wave having an apex angle of predetermined value at a selected relative wind speed which may be the cruising air speed of the aircraft.

In order to avoid the production of substantial parasite drag, the trailing end of such a protuberance should be faired so that a protuberance used in the present invention should be tapered oppositely fore and aft from its generally central portion. Conveniently, therefore, such a protuberance may be double-ended so that if its leading portion is of semiconical shape, its trailing portion would be of similar semiconical shape. Also for greatest effectiveness the longitudinal plane of the maximum compressional bow wave produced by the protuberance should be disposed substantially parallel to the high pressure surface of the airfoil and spaced from such surface a distance equal to the thickness of the boundary layer on such high pressure airfoil surface at the speed where it is desired that the protuberance produce maximum increase in lift.

Figure 1:
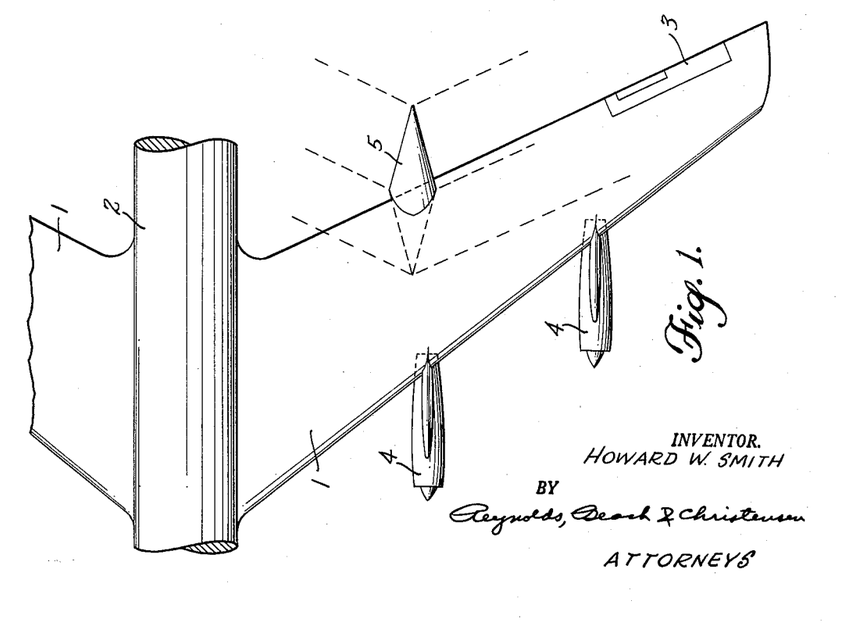
Figure 1 is a plan view of one airplane wing, the adjacent portion of the fuselage, and a fragmentary portion of the other airplane wing showing a compressional bow wave inducing protuberance mounted beneath the trailing portion of the wing.

A specific application of these principles may be considered in connection with the representative protuberance installation on the wing of an airplane shown in Figure 1 of the drawings. The swept-back wings 1 project oppositely from the fuselage 2 and are provided with conventional ailerons 3 for controlling rolling of the aircraft. Such ailerons may be utilized for control purposes only at subsonic speeds, if desired, and suitable mechanism may be provided for locking them against movement relative to the wings at supersonic speeds if desired. The airplane can be propelled by jet engines 4 carried by the wing.

Beneath each of the wings 1 is mounted an airfoil lift modifying protuberance 5. One of these protuberances is shown, but the other wing will have a similarly mounted protuberance, and these protuberances will be arranged symmetrically about the centerline of the airplane in order to modify similarly the lift on each wing under straight flight conditions. These protuberances are shown as being mounted on the trailing portion of the wing and located approximately centrally of the wing span. Such protuberances have a sharp prow and taper fore and aft from their central or waist portions, in the form shown being double-ended, to reduce their drag. The aft portions of these protuberances are of circular cross section and the waist is faired smoothly into the upper surface of the wing's trailing edge.

Figures 2, 3:
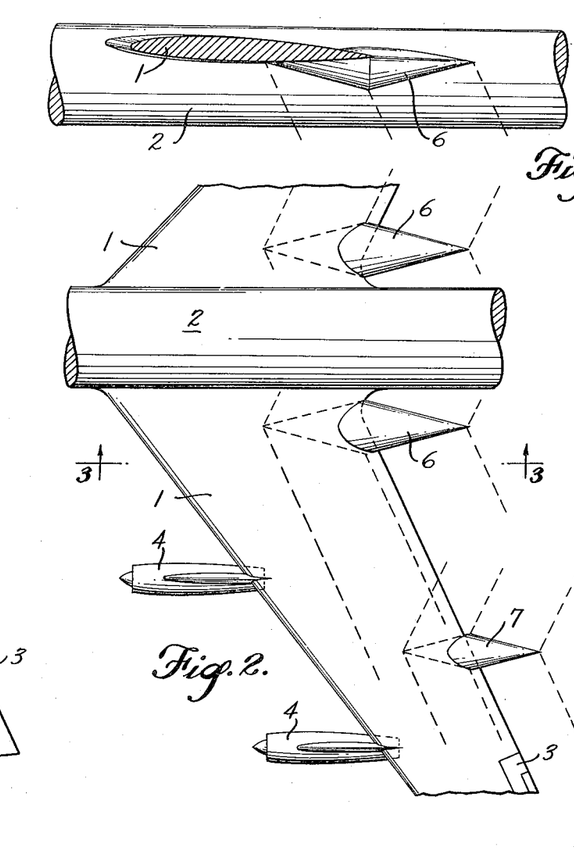
Figure 2 is a plan view of inboard portions of airplane wings and the intervening portion of the fuselage showing lift modifying protuberances beneath the wings in a different arrangement.
Figure 3 is a longitudinal vertical sectional view of this arrangement taken on line 3—3 of Figure 2.

The profile of each such protuberance in a vertical plane may be like that shown in Figure 3, the portion forward of the waist being of approximately semi-conical shape and having a substantially flat surface through the conical axis disposed adjacent and parallel to the high pressure bottom surface of the wing. In this installation the primary purpose is to increase the pressure beneath the wing for the purpose of improving its lift and since, because of the compressional bow wave, an expansion wave is produced immediately aft of the waist of the protuberance causing a reduction in pressure, it is desirable for the waist of the protuberance to be located approximately coincident with the trailing edge of the wing and the portion of the protuberance aft of the waist to be in non-overlapping relationship with the wing, as shown in Figure 1. Substantially the entire area of pressure lower than ambient atmospheric pressure produced by the protuberance will therefore be aft of the wing so that it will not detract from the pressure beneath the wing.

The shape of cross-section of the protuberance and its fore and aft profile may be selected appropriately depending upon the general wing characteristics, the location of the protuberance on the wing, and the effect which it is desired that the protuberance produce. Where a protuberance is mounted beneath a swept-back wing as shown in Figure 1, it is desirable for the protuberance to be designed so that, at the speed of the airplane at which the greatest effectiveness of the protuberance in modifying the wing lift is desired, the angle of the outboard bow wave with respect to the direction of the relative wind will be approximately the same as the angle of the wing span relative to the airplane's longitudinal axis. This situation is shown in Figure 1, and it should be noted that the included angle of the compressional bow wave is much greater than the angle of the protuberance prow.

It is well known that the included angle of a compressional bow wave is reduced as the speed increases in the supersonic speed range. A representative prow angle for protuberances used in accordance with the present invention on airplanes flying at lower supersonic speeds, such as Mach number 1 to 1.2, would be 20°. To obtain a compressional bow wave included angle of the same value at higher speeds, a protuberance with a larger bow angle would be used. In order to obtain the greatest lift increasing effectiveness from the compressional bow wave of the protuberance for variations in speed above and below the speed at which the outboard compressional bow wave is parallel to the wing span, the protuberance should be mounted so that its prow is approximately at the center of the wing chord. Such disposition will enable the compression field to blanket the lower surface of the wing to the greatest extent.

In Figure 1 the protuberance 5 is located in the slip stream of the inboard jet engine 4 so that the velocity of the relative wind passing over it will be greater than it would be otherwise. Consequently, the included angle of the bow wave will be smaller than it would be if the protuberance were in the free air stream, and this circumstance should be taken into account in designing the prow angle of the protuberance.

In Figure 2 two trailing edge protuberances 6 and 7 are provided on each wing, the protuberances 6 being located farther inboard than the protuberance 5 shown in Figure 1, and the protuberances 7 being located farther outboard than the protuberance 5 of Figure 1. In this instance also the arrangement of the protuberances on the two wings will be symmetrical so that a second outboard protuberance 7 will be provided on the starboard wing not shown in Figure 2. Because the wing is tapered in plan form it is preferred that the inner protuberances 6 be larger than the outboard protuberances 7. The outboard protuberances will increase the pressure beneath the wing principally outboard of them, while the inboard protuberances will produce their principal pressure increasing effect by their compressional bow waves on the portions of the wing between the inboard and outboard protuberances.

Figures 4, 5, 7, 8, 9, 10:
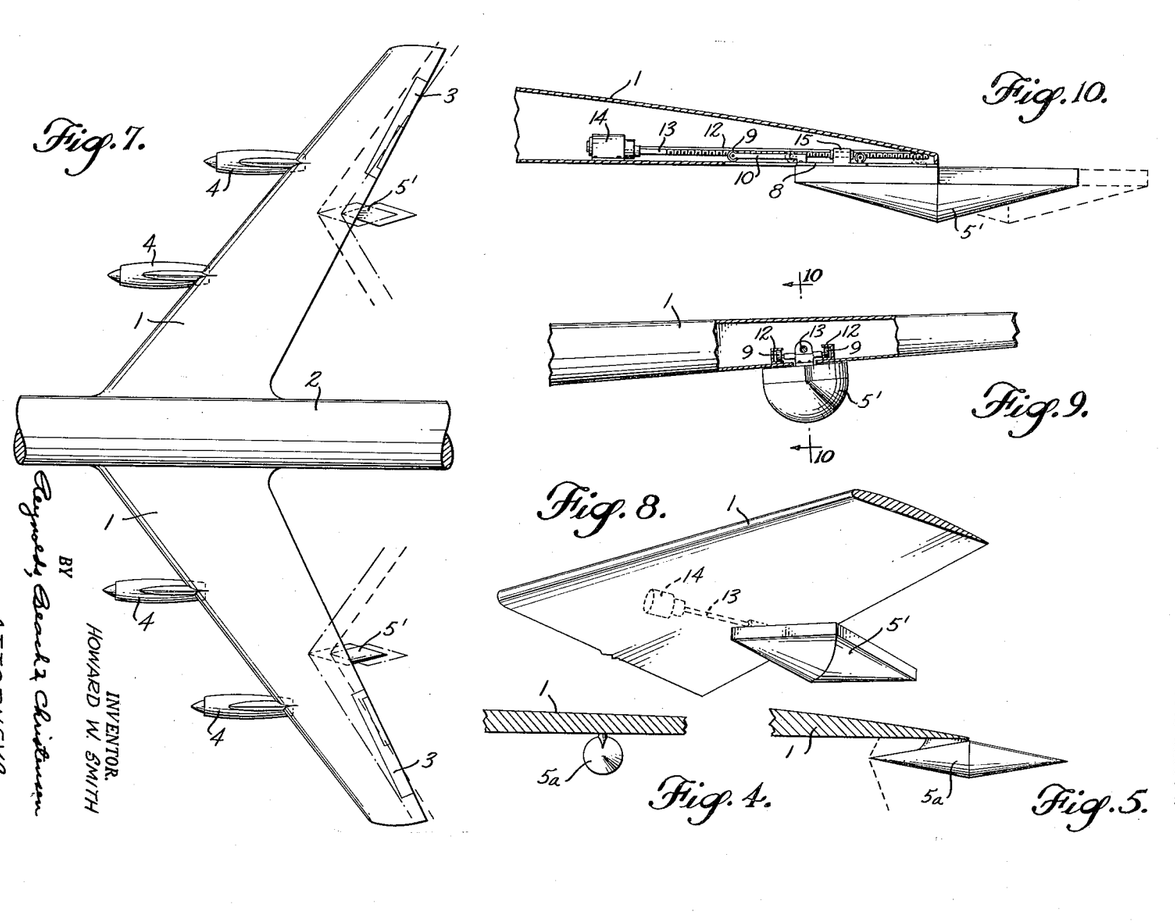
Figure 4 is a spanwise section through a fragment of an airplane wing showing a front view of a different type of protuberance.
Figure 5 is a chordwise section through such wing fragment showing this protuberance in side elevation.
Figure 7 is a plan view of an airplane having portions of its fuselage broken away and showing compressional bow wave inducing protuberances mounted on its wing which are movable for control purposes.
Figure 8 is a bottom perspective view of a wing fragment carrying such a protuberance and indicating protuberance shifting mechanism.
Figure 9 is a front view of the wing portion of Figure 8, parts being broken away to show supporting and shifting mechanism for the protuberance.
Figure 10 is a longitudinal sectional view through a trailing portion of the wing taken on line 10—10 of Figure 9.

As indicated in Figure 2, there is probably some adverse interference between the compressional bow waves of the inboard and outboard protuberances, and while also there may be an adverse effect because of the interference between the inboard bow wave of each inboard protuberance and the fuselage, the net effect of the two protuberances will be to increase the wing lift. Because of such interferences with the compressional bow waves induced by the protuberances, it is to be expected that the drag of the two protuberances on each wing, as shown in Figure 4, will be greater than the proportionate increase which might be expected over the use of a single protuberance on each wing as shown in Figure 1. For some installations, however, particularly where the airplane wings are relatively long and it is desirable to obtain the maximum increase in wing lift by the use of such protuberances, it may be desirable to use two or even more protuberances on each wing.

Protuberances for increasing airplane wing lift need not be of substantially semicircular transverse cross section, although protuberances having such a cross section are very effective. Thus in Figures 4 and 5 a protuberance 5a having a circular transverse cross section is shown. Such protuberance is illustrated as having a sharp, conical prow and stern, which shape is most effective ordinarily, but protuberances of other shape having a substantial effect in improving the wing lift could be used. The closer the protuberance is to the under surface of the wing, the greater will be the increase in wing lift which it produces.

Figures 6, 18, 21:
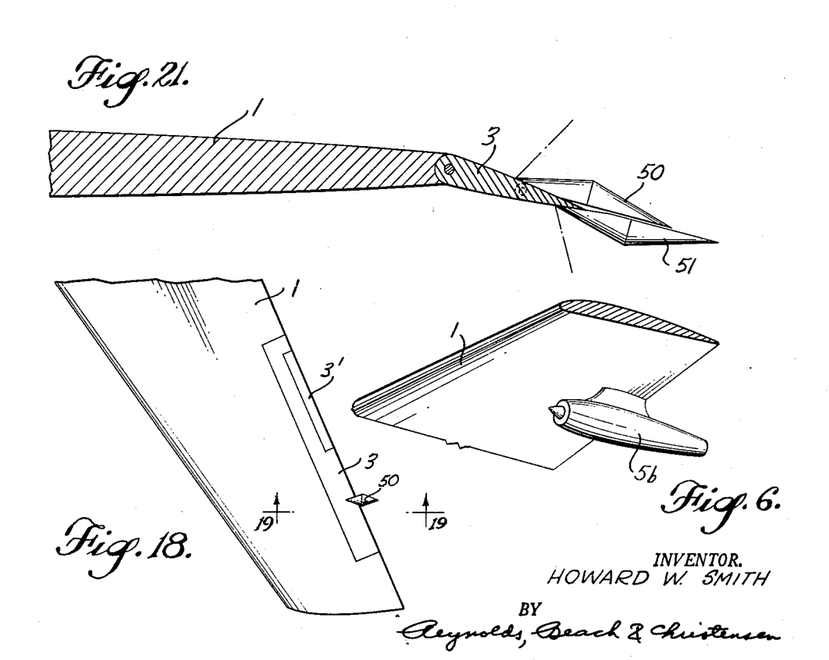
Figure 6 is a bottom perspective view of an airplane wing fragment on which is mounted still another type of lift modifying protuberance, which may be a turbojet engine, for example.
Figure 18 is a plan view of an outboard portion of an airplane wing showing a protuberance mounted on an aileron.
Figure 21 is a similar view showing the aileron displaced in the opposite direction.

In Figure 6 a protuberance 5b is illustrated, which is mounted on the wing 1 in a location generally similar to the location of protuberance 5a shown in Figures 4 and 5. In this instance, however, the prow is not sharp and the protuberance is generally streamlined from front to rear instead of having a sharply defined waist. Protuberances such as shown in Figures 4, 5 and 6 could be used for various purposes. That of Figures 4 and 5, for example, could constitute a fuel tank, and the protuberance 5b of Figure 6 could be a turbojet engine.

While the protuberances as described in connection with Figures 1, 2 and 3 provide the operation discussed when they are fixed relative to the wings, it is possible to utilize some or all of such protuberances to effect control movements of the airplane. Thus, rolling control of the airplane could be effected with an installation such as shown in Figure 1, merely by moving one of the protuberances rearward or forward while the other protuberance remains stationary. Such rearward or forward movement will reduce the lift increasing effectiveness of the protuberance on that wing so that such wing will drop, causing the airplane to roll toward that side. Alternatively, the protuberances could be mounted farther toward the trailing edges of the airplane wings and lateral control could be obtained by moving one of the protuberances forward while the other remains stationary. The protuberance thus moved will increase the lift on its wing so that such wing would rise to roll the airplane.

In determining the initial position of the protuberance and the amount of its movement to effect a control function, the length and width of the protuberance are not controlling. The important factor is the location of the waist portion of the protuberance, from which it is tapered forward and rearward, relative to the trailing edge of the airplane wing. Where the compressional bow wave is relied upon to increase the pressure on the adjacent principal surface of the airfoil, such waist should be located substantially at the trailing edge of the airfoil with the portion of the protuberance aft of the waist in non-overlapping relationship with the airfoil, which expression is intended to include its location somewhat aft of such trailing edge, but not appreciably forward of the trailing edge. In such an installation the protuberance preferably is of semicircular or U-shaped cross section, instead of being of circular cross section, providing a flat side adjacent to the airfoil.

If a decrease in wing lift is to be produced by forward movement of a protuberance, the waist portion of the protuberance must be moved a substantial distance forward of the trailing edge of the airfoil so that, despite the production of the expansion wave with a substantial angle of sweep-back, an appreciable area of its field will blanket a portion of the airfoil. The farther such protuberance is moved forward, of course, the greater will be the span of the expansion wave field blanketing a portion of the airfoil. To enable such movement the flat side of the protuberance should extend rearwardly to a location adjacent to the trailing edge of the wing when the protuberance is in its most forward position, or a slot could be provided for a short distance to receive the trailing edge of the wing, although the portion of the protuberance above the slot should not be of a formation to produce an expansion wave at the side of the airfoil opposite that adjacent to the flat side of the protuberance.

Similarly, for control purposes some or all of the protuberances 6 and 7 of the installation shown in Figure 2 could be movable to effect rolling control of the airplane. It may be possible to produce sufficient control by movement of only one of the protuberances on each side of the longitudinal axis of the airplane. Thus the inboard protuberances 6 may be mounted stationarily on their wings, because a variation in lift produced by them would have very little effect on the rolling moment in any case since they are so close to the longitudinal axis of the airplane. One or both of the outboard protuberances 7, however, could be moved for effecting rolling control, or such control surfaces could be moved differentially fore and aft to produce a rolling moment.

While, as has been discussed, the protuberances shown in Figures 1, 2 and 3 or some of them could be made movable for the purpose of effecting rolling control of the airplane, a form of protuberance more suitable for effecting control functions is shown in Figures 7 to 10, inclusive. As in the previous installations described, the protuberances 5' are mounted beneath the wings of the airplane. They are of substantially semi-circular cross section. The upper surface of the protuberance is substantially flat and disposed adjacent and parallel to the high pressure bottom surface of the wing. As shown, however, it is preferred that the longitudinal plane through the axis of the protuberance be spaced below the lower surface of the wing a distance substantially equal to the thickness of the boundary layer next to the wing. Since the high pressure field of the compressional bow wave will be greatest in longitudinal alignment with the greatest width of the protuberance, it is preferred that such greatest width location, which occurs in the horizontal plane through the longitudinal axis of the protuberance, be located approximately coincident with the outer extremity of the boundary layer.

Such disposition may be effected either by spacing the maximum width portion of the protuberance from the high pressure surface of the airfoil or by extending the maximum thickness portion of the protuberance the depth of the boundary layer, as shown in Figures 8, 9 and 10. In determining the location of the maximum width portion of the protuberance, only that portion at the extremity of the boundary layer need be considered because within the thickness of the boundary layer it is largely immaterial whether the protuberance is wider or narrower. These protuberances 5' are mounted for fore and aft movement, but in their normal positions their waists should be located aft of the trailing edges of the wing so that, as explained in connection with Figure 1, the expansion wave will always be wholly behind the wings.

By mounting both protuberances 5' for force and aft movement their wing lift modification effect can be increased by moving them conjointly forward and decreased by moving them conjointly aft. The wing lift will be increased if the protuberances are both moved forward because of the areas of the portions of the compressional bow wave fields in registry with the lower surface of the wing will be expanded, whereas if both protuberances are moved rearwardly simultaneously the areas of such compressional bow wave portions beneath the wing will be reduced.

To roll the airplane for control purposes only one or the other of the protuberances could be moved forward or aft from its normal position in order to alter the lift of that wing, as has been discussed in connection with the installation of Figure 1. For increased effectiveness of control, however, the protuberances 5' on the opposite wings may be connected for differential movement so that when one of the protuberances is moved forward the other protuberance will be moved rearward. By forward movement of one protuberance the force on the high pressure side of its wing will be increased so as to increase the lift on that wing. Rearward movement of the other protuberance will reduce the area of its wing on which the compressional bow wave pressure is effective. The airplane will therefore roll toward the side of the rearwardly moved protuberance.

By moving the protuberances a much more reliable control is afforded to the pilot of the aircraft at supersonic speeds than by movement of an aileron 3. Moreover, deflection of the ailerons increases the drag on the airplane, whereas fore and aft movement of the protuberances does not appreciably alter their drag characteristics. If the protuberance has a broad base as shown best in Figure 9, the adjusting mechanism for effecting longitudinal movement of the protuberance can be covered more easily. As shown in this figure, the cross-sectional shape of the forward portion of the protuberance is U-shaped rather than being strictly semi-conical.

Preferably the adjusting mechanism is such as to enable paired protuberances at opposite sides of the longitudinal axis of the airplane to be moved forward or rearward independently or simultaneously in the same direction or in differential directions. Also the control mechanism should enable the protuberances to be locked against displacement at subsonic speeds. The protuberance 5' shown in Figures 8, 9 and 10 is supported by a carriage including a mounting plate 8 carrying a pair of front wheels 9 on a forwardly extending arm 10 and a pair of rear wheels 11. The forwardly extending arm affords stability to the carriage by increasing the spacing between the wheels 9 and 11 even though the carriage plate is secured to the forward portion of the protuberance, so that in its rearwardly adjusted position the trailing end of the protuberance may project a substantial distance rearwardly of the trailing edge of the airfoil. These wheels 9 and 11 are guided for fore and aft movement in suitable channel-shaped tracks 12.

Movement of the carriage along the tracks 12 to shift the protuberance fore and aft may be effected by a lead screw 13 rotated by a motor 14 and threadedly engaged with a nut in the form of a threaded boss 15 mounted on the carriage plate 8. As the pilot effects energization of the reversible motor 14 in one direction or the other, the turning of the lead screw will move the nut boss 15 forward or rearward along the lead screw. The motors 14 controlling movement of the protuberances at opposite sides of the longitudinal axis of the airplane can be electrically connected for conjoint operation so that they can be energized simultaneously to rotate in the same direction for moving their respective protuberances simultaneously in the same direction. The motors can also be electrically connected for opposite rotation so that their respective lead screws will turn oppositely, thus to effect simultaneous differential movement of the protuberances 5'. Alternatively, controls may be provided to energize each of the motors independently, depending upon the type of control desired for the particular airplane.

While the protuberances discussed thus far have been mounted on an airplane wing, protuberances having a similar lift modifying effect can be mounted on empennage stabilizing surfaces as shown in Figures 11 to 17, inclusive. Such stabilizing surfaces can be those of an airplane or of an aircraft having sustentation means other than wings. Such control protuberances may be applied to vertical or horizontal stabilizing surfaces, and in either case may be designated as airfoil lift modifying protuberances because the aerodynamic lift force acts transversely of the direction of flight. When used in its broad sense, therefore, the lift produced by an airfoil, and particularly a control or stabilizing airfoil, may be either up, down, sidewise, or in any other direction transversely of the direction of flight. In all of the empennage installations shown twin protuberances are provided the protuberance elements of which are of similar size, shape and profile, are mounted on opposite sides of a stabilizing surface and are movable differentially between positions in mutual registry.

Figures 11, 12, 13, 14, 15, 16, 17:
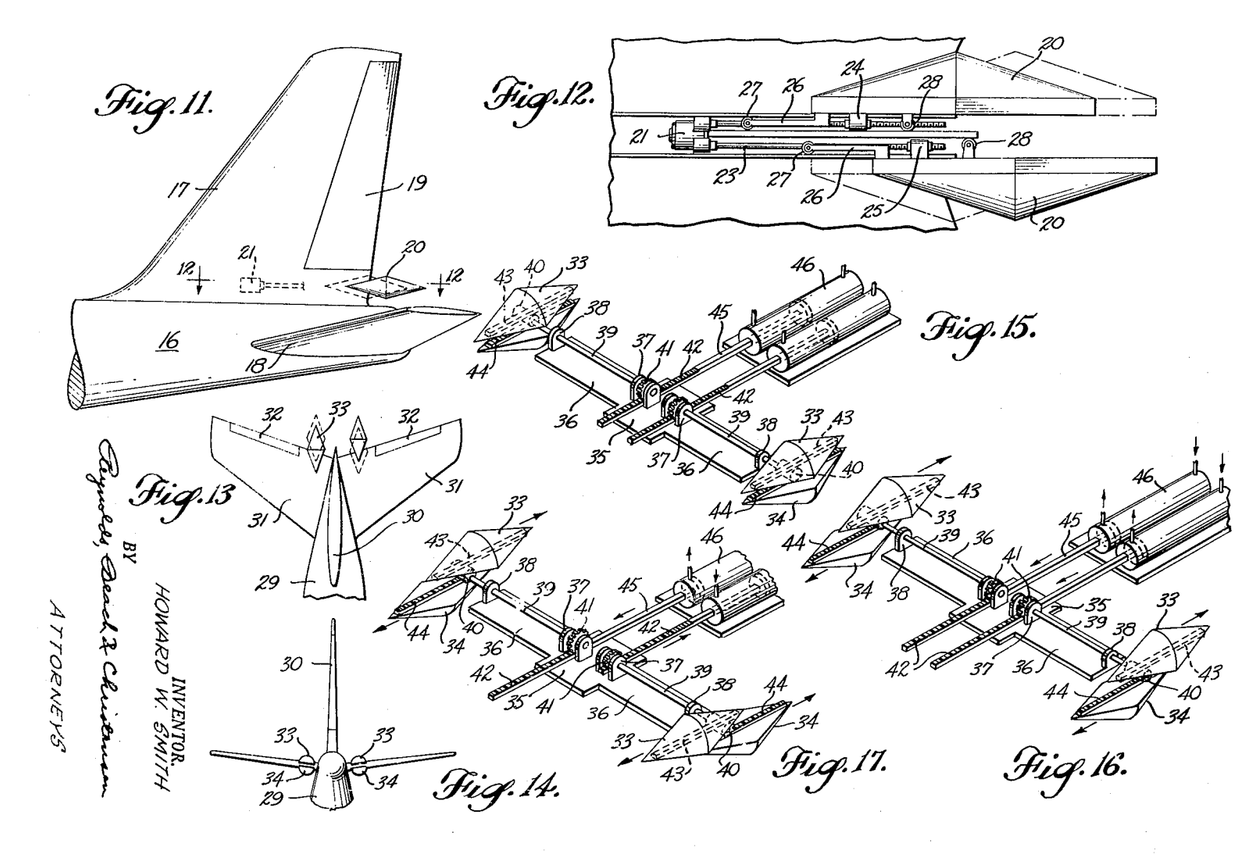
Figure 11 is a side elevation view of an aircraft empennage showing protuberances applied to the vertical fin.
Figure 12 is an enlarged detail horizontal sectional view of the protuberance installation taken on line 12—12 of Figure 11.
Figure 13 is a plan view of an aircraft empennage showing protuberances installed on the horizontal stabilizer.
Figure 14 is a rear elevation view of such empennage end protuberance installation.
Figure 15 is a top perspective diagrammatic view of the protuberance installation shown in Figures 13 and 14 with the protuberances in neutral position.
Figure 16 is a similar view showing the protuberances displaced in one relationship.
Figure 17 is a similar view showing the protuberances displaced in a different relationship.

Figure 11 shows the aircraft fuselage 16 carrying the empennage including the vertical fin 17 and the horizontal stabilizers 18, as is conventional. The vertical fin has a rudder 19 hinged on its trailing edge and extending spanwise of the vertical fin from a location adjacent to the upper end of the fin to a location near the fuselage 16. Twin protuberances 20 are mounted respectively on opposite sides of the vertical fin 17 between the fuselage 16 and the adjacent end of the rudder 19. At supersonic speeds such rudder will be locked so that it cannot swing relative to the vertical fin 17.

At supersonic speeds the protuberances 20, if movable differentially and located properly, can produce pressure fields on the vertical fin and fixed rudder combination so that such combination will increase the lift to port or starboard. In order that the pressure fields of the compressional bow waves of the protuberances 20 may have this effect, it is necessary that the lift-modifying action of such waves on the opposite sides of the fin and rudder combination be differently altered. Such difference can be produced if the protuberances 20 are mounted on the trailing portion of the vertical fin, as shown in Figure 11. When these protuberances are in registry transversely of the direction of flight their waists should be located aft of the trailing edge of the vertical fin and rudder combination, and in their most forward positions their waist portions should not be appreciably forward of the trailing edge of the vertical fin as shown in broken lines in Figure 11.

In Figure 12 representative actuating mechanism for shifting the protuberances 20 is illustrated. Such actuating mechanism may include a motor 21 which, through suitable gearing, drives a pair of lead screws 22 and 23. Such gearing may drive the lead screws in opposite directions and both lead screws may be threaded in the same direction, or one of the lead screws may have a right-hand thread and the other a left-hand thread and the gearing may be such as to drive the screws in the same direction. Such screws are threaded respectively into nuts 24 and 25, carried by or formed in lugs attached to the two protuberances, respectively.

The protuberances are mounted for longitudinal sliding movement by carriages 26 provided with wheels 27 and 28 which are guided to roll in suitable tracks. The motor 21 is reversible so that as it is driven in one direction the port protuberance 20 will be moved rearward and the starboard protuberance 20 will be moved forward, whereas when the motor is driven in the opposite direction the port protuberance will be moved forward and the starboard protuberance will be moved rearward. The limits of fore and aft movement of the two protuberances are indicated in Figure 12.

Taking as a representative example of a control movement of the protuberances that shown in Figure 11 of the drawings, the port protuberance 20 has been shifted rearwardly and the starboard protuberance has been shifted forwardly. It will be evident that the forward movement of the starboard protuberance shown in dot-dash lines has moved the waist portion of such protuberance alongside the trailing edge of the vertical fin so that the largest portion of the compressional bow wave generated by the prow of the protuberance is in registry with the fin while the expansion wave generated by the waist does not extend appreciably onto the vertical fin and rudder combination. Simultaneously, rearward movement of the port protuberance has reduced the area of the compressional bow wave which is effective to increase the pressure on the port side of the fin and rudder combination so that the pressure on this side of the combination has been decreased while the pressure on the starboard side of the combination has been increased. The result will be that the greater pressure on the starboard side of the vertical fin and rudder combination will produce a lift in the port direction, causing the aircraft to yaw to starboard. If a suitable rolling moment is produced simultaneously by varying the lift of the wings as described above, the airplane will bank as it yaws and execute a turn to starboard.

The same principles of control at supersonic speeds apply to effecting pitching of the airplane by provision of relatively movable protuberances in association with the horizontal stabilizers. Moreover, such protuberances may also be manipulated to exert a rolling moment on the aircraft if desired. In Figures 13 and 14 the aircraft fuselage 29 is shown as having mounted on it a conventional vertical fin and rudder combination 30 and conventional horizontal stabilizers 31. On the trailing portions of these stabilizers are mounted elevators 32 of the customary type, which will be operable to control pitching of the aircraft at subsonic speeds but which should be locked to prevent movement of such elevators relative to the horizontal stabilizers at supersonic speeds.

On the trailing portions of the horizontal stabilizers 31 at locations inboard of the elevators 32 is mounted a pair of twin protuberances, such protuberances being disposed symmetrically at opposite sides of the longitudinal axis of the aircraft, and their waists of maximum cross-sectional area being located substantially in coincidence with the trailing edges of the respective stabilizers in the most forward positions of such protuberances. These protuberances include the two upper protuberances 33 and two lower protuberances 34. Actuating mechanism for shifting these protuberances of representative type is shown in Figures 15, 16 and 17, and should be capable of moving forward both upper protuberances 33 while both lower protuberances 34 are moved rearward, as shown in Figure 16, or vice versa, and should also be capable of shifting the upper port protuberance and the lower starboard protuberance forward and the upper starboard protuberance and the lower port protuberance rearwardly conjointly and to the same extent, as shown in Figure 14, or vice versa.

Actuating mechanism capable of thus shifting the protuberances 33 and 34 may include a fixed plate 35 on each of the two opposite sides of which is mounted a laterally extending plate 36. At the inboard end of each of these plates is a bearing post 37 and at the outboard end is a bearing post 38 through which extends a shaft 39, the outboard end of which carries a gear 40. The inboard end of each such shaft also carries a gear 41 meshing with a control rack 42. The outboard gear 40 meshes both with an upper rack 43 mounted on the flat under surface of the protuberance 33 and a rack 44 mounted on the flat upper surface of the protuberance 34. Rack 42 is carried by the piston rod 45 of a fluid pressure actuator 46.

When the protuberances are in their neutral positions their waists are located rearwardly of the trailing edges of the horizontal stabilizers 31. If both fluid pressure actuators 46 are now operated in the same direction to shift the piston rods 45 aft as shown in Figure 16, the shaft 41 will be rotated in a clockwise direction as seen in this figure and the shafts 39 and gears 40 will be rotated simultaneously in the same direction. The gears 40 meshing with racks 43 and 44 on the adjacent flat sides of the protuberances 33 and 34 will cause the upper protuberances 33 to be shifted forwardly and the lower protuberances 34 to be shifted rearwardly, as shown in Figure 16. Such movement of the upper protuberances 33 will cause the fields of their compressional bow waves to move forward over the trailing portion of the upper side of the control surface so as to increase the pressure on it substantially. Rearward movement of the protuberances 34 will simultaneously reduce the blanketing effect of the compressional bow waves of such protuberances on the lower surfaces of the horizontal stabilizer and elevator combination. Consequently, the pressure on the lower surfaces of the horizontal stabilizer and elevator combinations will be appreciably less than the pressure on their upper surfaces so that the empennage will be depressed, producing an ascending pitching moment. On the contrary, if the protuberances 33 were shifted rearward and the protuberances 34 were shifted forward, the increase in pressure on the under surface of the stabilizer and elevator combination and the decrease in pressure on its upper surface would produce a descending pitching moment.

If instead of creating merely a pitching moment it should be desired to effect a rolling moment by the air reaction on the horizontal stabilizer and elevator combinations, fluid under pressure could be supplied to the forward end of the port actuator 46 and to the rearward end of the starboard actuator 46, for example. In that event the port piston rod 45 and rack 42 would be shifted rearwardly as shown in Figure 17 to move the upper port protuberance forward and the lower port protuberance rearward. Simultaneous supply of fluid under pressure to the rearward portion of the starboard actuator 46 would move the starboard piston rod 45 and rack 42 forward, which would effect movement of the upper starboard protuberance rearward and of the lower starboard protuberance forward, as shown in Figure 14.

Such relative movement of the port protuberances would, as explained in connection with Figure 13, cause a greater area of the compressional bow wave field induced by the port protuberance 33 to move into registry with the upper side of the port horizontal stabilizer and elevator combination, while rearward movement of the lower port protuberance 34 would decrease the effect on the under side of the port horizontal stabilizer and elevator combination of the pressure produced by its compressional bow wave. Consequently, the force on the upper side of the port stabilizer and elevator combination would be greater than the force on its lower side, tending to depress such stabilizer and elevator. Conversely, rearward movement of the starboard protuberance 33 and forward movement of the lower starboard protuberance 34 would result in a greater pressure on the lower side of the starboard stabilizer and elevator combination than on its upper side, tending to raise such stabilizer and elevator.

Because of the downward force differential on the port horizontal stabilizer and elevator combination and the upward force differential on the starboard stabilizer and elevator combination a rolling moment in a counterclockwise direction, looking forward, would be produced on the empennage by shifting the protuberances in the manner illustrated in Figure 14. A combination of pitching and rolling moments could, of course, be produced by supplying fluid under pressure to the actuators 46 in such a manner as to displace the piston rods 45 unequal distances from the neutral positions shown in Figure 12. It will be evident that suitable control mechanism could be devised for thus supplying fluid under pressure to the two actuators 46 to obtain any desired positional relationship of the port and starboard protuberances 33 and 34, depending upon the type of moment desired to be produced on the aircraft.

In Figures 11 to 17, inclusive, the arrangement of the protuberances shown and described produces aerodynamic forces on the control surface and stabilizer surface combination since such two surfaces would be locked against relative movement at supersonic speeds. Protuberances may, however, be used to produce aerodynamic forces on a control surface rather than on a stabilizing surface, if desired, and to illustrate such application a pair of protuberances 50 and 51 is shown in Figures 18 to 21, inclusive, as being mounted on the aileron 3 of an airplane. While only one wing tip is shown in Figure 18, the aileron of the other wing would be equipped similarly. Moreover, such protuberances could be applied to other airplane control surfaces if desired, such as the rudder and elevators. This type of installation may be particularly desirable where control tabs 3' are used at subsonic speeds to effect movement of a principal control surface, such as the aileron 3. At supersonic speeds such tabs preferably would be locked against movement relative to the control surfaces on which they are mounted. While no operating mechanism for shifting the protuberances 50 and 51 differentially relative to the airplane wing 1 is shown in Figures 18 to 21, such mechanism should be capable of effecting simultaneous forward movement of the upper protuberance 50 on one aileron and of the lower protuberance 51 on the other aileron, and simultaneous rearward movement of the lower protuberance 51 on the first aileron and of the upper protuberance 50 on the other aileron. Such mechanism could be of the general type illustrated in Figure 17. Alternatively, as discussed above, a single protuberance could be provided on each aileron 3, such protuberance preferably being the lower protuberance 51, and suitable controls could be provided for effecting their differential movement.

Where only a single protuberance is provided on each aileron, operating mechanism of the type shown in Figures 8, 9 and 10 could be employed in conjunction with suitable control mechanism for coordinating energization of the motors 14.

Figure 19:
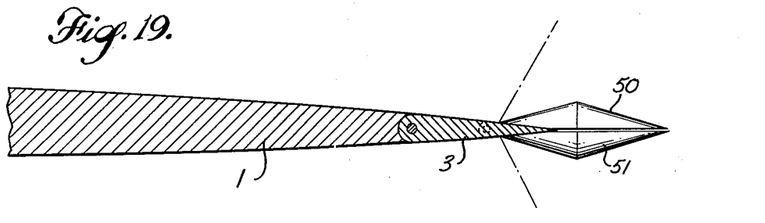
Figure 19 is an enlarged longitudinal sectional view through the trailing portion of such wing taken on line 19—19 of Figure 18.
Figure 20:
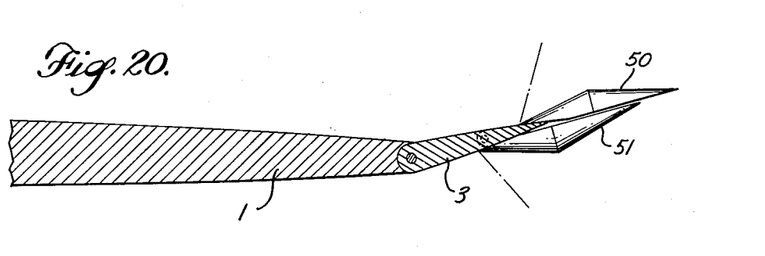
Figure 20 is a view similar to Figure 19 showing the aileron displaced in one direction.

As shown best in Figure 19, the protuberances are mounted with their waists of largest cross-sectional area a substantial distance behind the trailing edge of the aileron 3 when the protuberances are in registry. As an upper protuberance 50 is moved rearward from the position shown in Figure 19 to that of Figure 20, the portion of the field of its compressional bow wave in registry with the upper surface of the aileron 3 will decrease, thus reducing the pressure on such surface. Corresponding forward movement of the lower protuberance 51 from the position shown in Figure 19 to that of Figure 20 will increase the high pressure produced on the aileron by the compressional bow wave of this protuberance as the pressure is reduced on the upper side of the aileron by rearward movement of the protuberance 50. The change in pressure differential thus produced will effect upward swinging of the aileron as indicated in Figure 20.

Conversely, rearward movement of the lower protuberance 51 and forward movement of the upper protuberance 50 from the positions shown in Figure 19 to those shown in Figure 21 will produce an increase in pressure above the aileron by protuberance 50 and reduction in the pressure beneath the aileron 3 by decrease of the field of the compressional bow wave of protuberance 51 in registry with the aileron. By this movement of the protuberances, therefore, the aileron can be swung downward. If the upper protuberances 50 were not provided, only a change in pressure on the lower surfaces of the ailerons 3 would occur, but a similar swinging effect on the ailerons would be produced if the lower protuberances were moved differentially because the pressure beneath one aileron would be increased and that beneath the other aileron would be decreased. Actually if the upper protuberances 50 were not used, the downwardly acting force of the compressional bow wave produced by the upper protuberances 50 would be eliminated, which would improve to some extent the lift characteristics of the wing and aileron combination. Where protuberances are utilized for controlling aileron movement, therefore, protuberances are not needed on the upper sides of the ailerons.

In the embodiment of the invention shown in Figures 1, 2 and 3, only the bow compressional wave of the protuberance was employed to increase the wing lift. It is also feasible in some designs to utilize the waist expansion wave, instead of the bow compressional wave, to increase the wing lift or to perform control functions.

Whether the effect of the waist expansion wave is used for control purposes or for increasing wing lift, the protuberance preferably has a flat side from at least the waist rearwardly adjacent to the principal surface of the airfoil on which the air pressure is to be reduced. Thus, as in the protuberances described above, the portion of the protuberance adjacent to the airfoil may be of approximately semicircular or U-shaped cross-section instead of being of circular cross section. Since the waist expansion wave produces a reduction in air pressure below ambient atmospheric pressure, it will be evident that the portion of the protuberance from the waist aft must be adjacent to the upper surface of a wing to increase its lift, so that the waist is located adjacent to the leading edge of the airfoil and the portion of the protuberance forward of the waist is in non-overlapping relationship with the airfoil.

In the airplane shown in Figures 22 to 25, inclusive, both types of pressure modifying protuberance induced waves are employed to increase the lift of the wing 1. Protuberances are also employed for effecting rolling, pitching and yaw control of the airplane in the manner explained previously. Consequently, it is not necessary to repeat here the functioning of the protuberances shown on the outboard portions of the wings and on the empennage.

In the airplane shown in Figures 22 to 25, inclusive, the fuselage has been designed in two components for the purpose of producing desired wing lift improving pressure modifying protuberance induced waves. The forward fuselage component 60 is mounted principally above and extends forwardly from the wing 1. The waist of this protuberant fuselage component is located approximately coincident with the leading edge of the wing so that its rearward portion, tapering aft from its waist, will produce an expansion wave. The pressure within the field of such expansion wave is less than ambient atmospheric pressure and consequently the wave induced by the rearward portion of the fuselage component 60 supplements the effect of the air stream flowing over the cabered upper surface of the wing in reducing the pressure above the wing and consequently producing lift.

The rearward fuselage component 61 on the other hand is located principally below the wing 1, and its prow may be located well forward, preferably adjacent to the leading edge of the wing 1. The waist portion of this protuberant rearward fuselage component is located at or aft of the trailing edge of the wing 1. If the included angle of the prow of the rearward fuselage component 61 is selected so that at cruising speed the included angle of the compressional bow wave induced by such prow of this fuselage component is equal to or slightly less than the included angle between the leading edges of the wings, the greatest lift effectiveness will be produced on the wing by such compressional bow wave.

Figures 22, 24, 25:
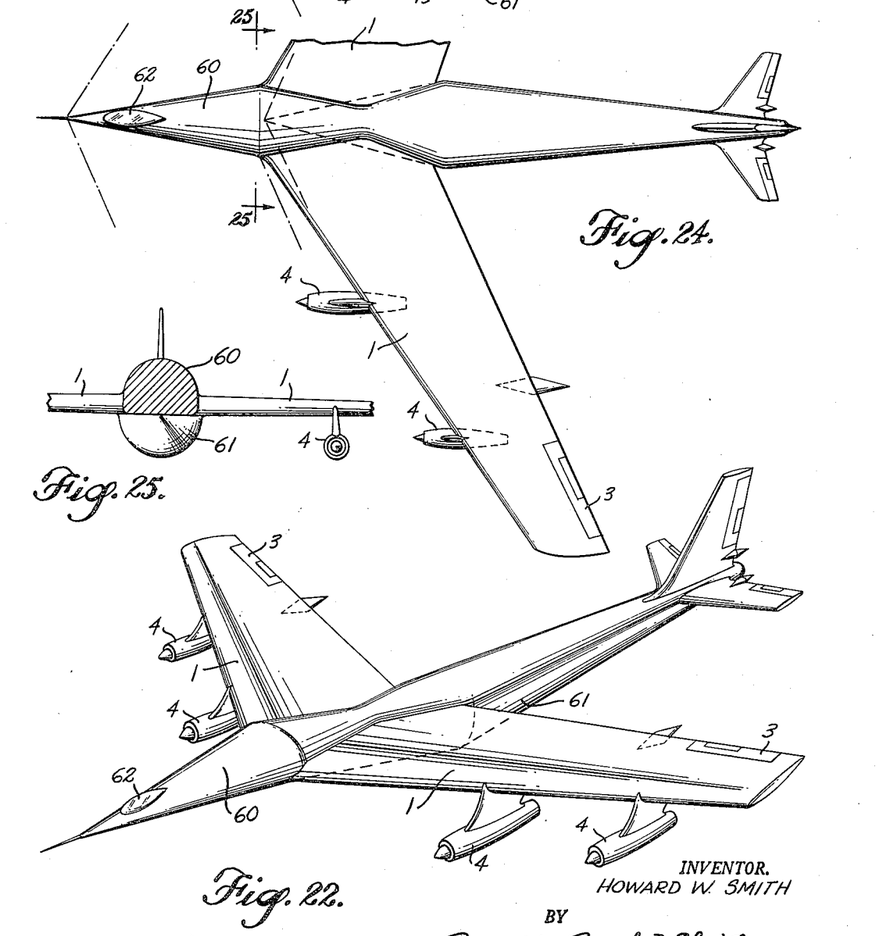
Figure 22 is a top perspective view of an airplane incorporating wing lift modifying fuselage protuberances and having lift modifying protuberances on its wings outboard of the fuselage and lift modifying control protuberances on its empennage.
Figure 24 is a plan view of such airplane, the major portion of one wing being broken away.
Figure 25 is a transverse sectional view through the airplane taken on line 25—25 of Figure 24.
Figure 23:
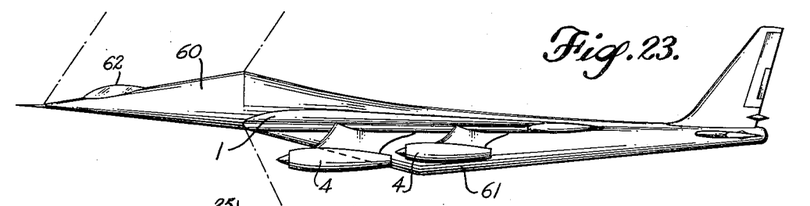
Figure 23 is a side elevation view of the airplane shown in Figure 22.

With a fuselage designed in two components, as shown in the airplane of Figures 22 to 25, inclusive, the cross-sectional shape of the portion of component 60 rearward of its waist will be preferably substantially semicircular, as illustrated in Figure 25. Similarly, the cross-sectional shape of the portion of fuselage component 61 forward of its waist will preferably be substantially semi-circular, as also shown in this figure. The fuselage components thus constitute protuberances the forward one of which generates a lift increasing expansion wave above the wing and the rearward one of which induces a pressure increasing bow wave beneath the wing which also increases its lift. Despite the formation of the fuselage in such two components, its utility will not be decreased too greatly because of the superposition of the rearwardly tapered aft portion of the forward fuselage component 60 above the forwardly tapered front portion of the rearward component 61, as illustrated in Figure 24.

For military or cargo airplanes the crew may be housed within an enclosure 62 in the forward portion of the fuselage component 60 and fuel and cargo can be carried in the rearward portion of the component 60 and in the component 61. In such airplanes it is not necessary for the airplane crew to have access to such other portions of the airplane during flight. In passenger aircraft the passengers could all be carried in the rearward fuselage component 61 and the rearward portion of the fuselage component 60 could be used for cargo space, or, if desired, a passageway extending upward and forward through the wing 1 could be provided to interconnect the rearward portion of the forward fuselage component 60 and the forward portion of the rearward fuselage component 61.

Other features of the airplane may be conventional and need not be described further.

I claim as my invention:

1. The combination of an airfoil, an air pressure modifying wave inducing protuberance elongated parallel to the chords of said airfoil and tapered forwardly and rearwardly from a waist of maximum cross-sectional area, and means supporting said protuberance adjacent to said airfoil with all of the portion of said protuberance between the waist and the rearward end of said protuberance in non-overlapping relationship with said airfoil and at least a portion of said protuberance between the waist and the forward end of said protuberance being in overlapping relationship with said airfoil, so that the portion of said protuberance in overlapping relationship with said airfoil produces, at supersonic speeds, an air pressure field on said airfoil.

2. The combination of a normally substantially horizontal airfoil of an airplane and a protuberance tapered forwardly and rearwardly from a waist of maximum cross-sectional area located adjacent to the leading edge of said airfoil, the portion of said protuberance rearwardly of the waist having a substantially flat side substantially parallel to the chord plane of said airfoil and substantially fitting said airfoil, and the portion of said protuberance aft of the waist protruding from the normally upper surface of said airfoil so that the waist produces a pressure decreasing expansion wave on such upper surface of said airfoil.

3. The combination of an airfoil and a protuberance tapered forwardly and rearwardly from a waist of maximum cross-sectional area, said protuberance having, forward of its waist, a substantially flat side substantially parallel to the chord plane of said airfoil and substantially fitting said airfoil, and means operable to move said protuberance fore and aft to shift its waist from a position substantially at the trailing edge of said airfoil to a location a substantial distance behind such trailing edge, the prow of said protuberance producing, at supersonic speeds, a pressure increasing compressional bow wave increasing the pressure on the trailing portion of the airfoil surface adjacent to said substantially flat side of said protuberance varying in amount generally corresponding to the fore and aft position of said protuberance relative to said airfoil.

4. The combination of a lift producing airfoil, an air pressure modifying wave inducing protuberance elongated parallel to the chords of said airfoil and tapered forwardly and rearwardly from a waist of maximum cross-sectional area, said protuberance having a generally horizontal substantially flat side, and means supporting said protuberance with said substantially flat side in overlapping relationship with and substantially fitting the trailing portion of said airfoil with the portion of said protuberance between its waist and the rearward end of the protuberance being in non-overlapping relationship with the airfoil, so that the portion of said protuberance in overlapping relationship with the airfoil produces, at supersonic speeds, an air pressure field on the adjacent surface of said airfoil.

5. The combination defined in claim 4, in which the portion of the wave inducing protuberance including the substantially flat side is of substantially semicircular cross section.

6. The combination defined in claim 4, in which the portion of the protuberance in overlapping relationship with the airfoil and having the substantially flat side has a sharp prow of substantially semiconical shape.

7. The combination defined in claim 4, in which the airfoil is an airplane wing and the protuberance is disposed adjacent to the lower surface of such wing.

8. The combination defined in claim 4, in which the waist of the protuberance is of substantially semicircular cross section.

9. The combination defined in claim 4, in which the protuberance is of substantially semicircular cross section throughout its length.

10. The combination defined in claim 4, in which the protuberance normally is disposed with its waist rearwardly of the trailing edge of the airfoil, and means operable to effect longitudinal movement of the protuberance relative to the airfoil to shift the waist of the protuberance to a position closer to the trailing edge of the airfoil for increasing the extent of the air pressure field on the airfoil produced by the congressional bow wave created by the protuberance.

11. The combination of an airfoil, a pair of protuberances, each protuberance of said pair being tapered forwardly and rearwardly from a waist of maximum cross-sectional area, each of said protuberances having a substantially flat side rearwardly of its waist and substantially parallel to the flat side of the other protuberance, and said protuberances being located on opposite sides of the trailing portion of said airfoil with their waists behind the trailing edge of said airfoil, and means operable to move said protuberances for shifting their waists forwardly toward the trailing edge of said airfoil.

12. The combination defined in claim 11, the means being operable to shift the protuberances simultaneously and differentially, one forwardly and the other rearwardly.

13. The combination of oppositely extending airplane wings and a pair of protuberances, each of said protuberances being tapered forwardly and rearwardly from a waist of maximum cross-sectional area and having, forwardly of its waist, a substantially flat side substantially parallel to the chord plane of one of said wings, and said protuberances being located beneath said wings, disposed respectively in corresponding positions at opposite sides of the central longitudinal plane of the airplane, with their prows disposed rearwardly of the leading edges of said wings, respectively, with their substatnially flat sides substantially fitting said wings and with their waists disposed at least as far aft as the trailing edges of the respective wings, the portions of said protuberances aft of their waists being in non-overlapping relationship with said wings.

14. The combination defined in claim 13, and means operable to move said protuberances fore and aft.

15. The combination defined in claim 14, the means being operable to shift the protuberances differentially and simultaneously, one forwardly and the other rearwardly.

16. The combination of an airfoil and a compressional bow wave inducing protuberance tapered forwardly and rearwardly from a waist of maximum cross-sectional area, said protuberance having its prow located rearwardly of the leading edge of said airfoil and its portion of maximum cross-sectional area disposed at least as far aft as the trailing edge of said airfoil, the entire portion of said protuberance aft of its portion of maximum cross-sectional area being in non-overlapping relationship with said airfoil.

17. The combination of a generally horizontal airfoil and a protuberance tapered forwardly and rearwardly from a waist of maximum cross-sectional area, said protuberance projecting above the upper side of said airfoil with its waist adjacent to the leading edge of said airfoil and the portion of said protuberance forward of the waist being substantially in non-overlapping relationship with said airfoil.

18. The combination of a generally horizontal airfoil and a compressional bow wave inducing protuberance tapered forwardly and rearwardly from a waist of maximum cross-sectional area, said protuberance being disposed with its waist at least as far aft as the trailing edge of said airfoil, a portion of said protuberance forward of the waist being in overlapping relationship with the airfoil and the entire portion of said protuberance aft of the waist being in non-overlapping relationship with said airfoil.

References Cited in the file of this patent

UNITED STATES PATENTS

| 1,782,013 | Rohrbach | Nov. 18, 1930 |
| 2,397,526 | Bonbright | Apr. 4, 1946 |

FOREIGN PATENTS

| 722,847 | Great Britain | Feb. 2, 1955 |